United States Patent
Shimamoto

(10) Patent No.: US 8,014,064 B2
(45) Date of Patent: Sep. 6, 2011

(54) MICROSCOPE ILLUMINATION DEVICE

(75) Inventor: Atsuyoshi Shimamoto, Tokyo (JP)

(73) Assignee: Olympus Corporation, Tokyo (JP)

( * ) Notice: Subject to any disclaimer, the term of this patent is extended or adjusted under 35 U.S.C. 154(b) by 210 days.

(21) Appl. No.: 12/465,048

(22) Filed: May 13, 2009

(65) Prior Publication Data

US 2009/0284833 A1 Nov. 19, 2009

(30) Foreign Application Priority Data

May 14, 2008 (JP) .................................. 2008-127414

(51) Int. Cl.
*G02B 21/06* (2006.01)
*G02B 21/00* (2006.01)

(52) U.S. Cl. ...................................... 359/385; 359/368

(58) Field of Classification Search .......... 359/368–390, 359/619

See application file for complete search history.

(56) References Cited

U.S. PATENT DOCUMENTS

| 6,507,434 | B2 | 1/2003 | Miyashita | |
| 6,985,288 | B2 * | 1/2006 | Miyashita et al. | 359/385 |
| 7,436,591 | B2 * | 10/2008 | Mizusawa | 359/388 |
| 2002/0012164 | A1 | 1/2002 | Miyashita | |
| 2007/0263226 | A1 * | 11/2007 | Kurtz et al. | 356/492 |
| 2009/0073695 | A1 * | 3/2009 | Shimamoto | 362/268 |
| 2009/0195866 | A1 * | 8/2009 | Kawaski et al. | 359/385 |

FOREIGN PATENT DOCUMENTS

| JP | 2002-6225 | A | | 1/2002 | |
| JP | 2003-5083 | | * | 8/2003 | 359/385 |
| JP | 2005-043517 | A | | 2/2005 | |

* cited by examiner

*Primary Examiner* — Thong Nguyen
(74) *Attorney, Agent, or Firm* — Holtz, Holtz, Goodman & Chick, PC

(57) ABSTRACT

A microscope illumination device comprising: a light source; an objective for illuminating a specimen; a collector lens for converting light from the light source into parallel light; a fly-eye lens placed near to rear focal point of the collector lens; an epi-illumination projection lens for projecting light source images generated by the fly-eye lens onto the objective pupil; a tube lens for imaging an observation light from the objective; and a fluorescence cube placed between the objective and projection lens and comprised a filter, satisfies the expression $\gamma^2 *f_{fly} *D < \gamma *f_{fly} *\phi - h*p$, where $\gamma$ is defined as the magnification of the projection lens, $f_{fly}$ as the focal distance of the fly-eye lens, D as the effective diameter of the fly-eye lens, $\phi$ as the effective diameter of the filter, h as the distance between the filter and the pupil, and p as the pitch of the fly-eye lens.

6 Claims, 5 Drawing Sheets

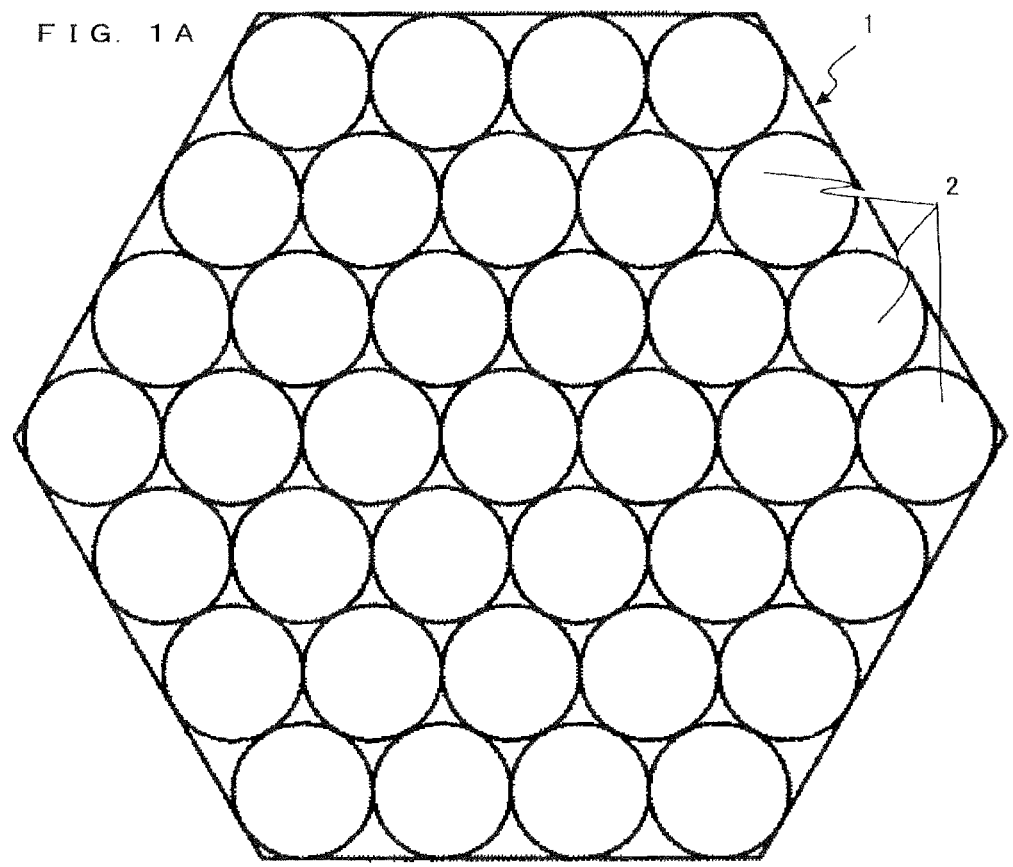
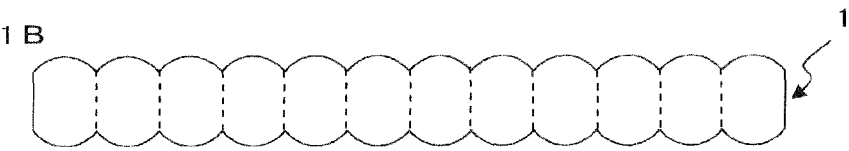
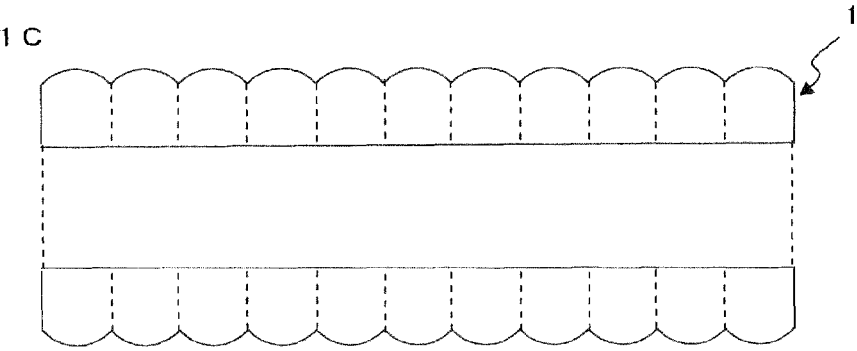

MICROSCOPE ILLUMINATION DEVICE

CROSS REFERENCE TO RELATED APPLICATIONS

This application claims the benefit of Japanese Application No. 2008-127414, filed May 14, 2008, the contents of which are incorporated by this reference.

BACKGROUND OF THE INVENTION

1. Field of the Invention

The present invention relates to a microscope illumination device.

2. Description of the Related Art

Conventional microscopes commonly employ individually a microscope illumination device comprising a Koehler illumination. In the Koehler illumination, there is a slight non-uniformity in terms of the light distribution characteristic of a light source, while there is no non-uniformity corresponding to the brightness distribution in terms of the position within the light source. Therefore, the illumination is popular as an optimal illumination device with little non-uniformity in illumination.

In recent years, however, technological improvements in and the popularization of photoelectric conversion elements such as charge-coupled device (CCD) and the like has caused imaging in digital images to become a common practice in the field of microscopy as well. As a result, even a slight illumination non-uniformity that is not apparent in a visual observation is conspicuous.

A known technique to alleviate such illumination non-uniformity is a technique utilizing a fly-eye lens. For example, Laid-Open Japanese Patent Application Publication No. 2002-006225 and Laid-Open Japanese Patent Application Publication No. 2005-043517 have disclosed a microscope illumination device equipped with a fly-eye lens at the rear focal position of a collector lens. This microscope illumination device projects a quasi surface illuminant formed in the fly-eye lens element of the fly-eye lens onto an aperture stop and projection lens, thereby eliminating the illumination non-uniformity corresponding to the light distribution characteristic of a light source.

An illumination optical system employing a fly-eye lens is more complex than a common illumination optical system. As a result, the illumination light is sometimes partially broken in the midst of the light path before the illumination light is projected on a specimen surface.

SUMMARY OF THE INVENTION

According to an aspect of the present invention, a microscope illumination device comprises: a light source; an object lens for illuminating a specimen; a collector lens for converting diverging light emitted by the light source into parallel light; a fly-eye lens placed near to the position of the rear focal point of the collector lens; an epi-illumination projection lens for projecting a plurality of light source images generated by the fly-eye lens onto the pupil of the object lens; an tube lens for imaging an observation light emitted from the object lens; and a fluorescence cube that is placed between the object lens and epi-illumination projection lens and which comprises at least one filter, wherein the following conditional expression is satisfied:

$$\gamma^2 {}^*f_{fly}{}^*D < \gamma {}^*f_{fly}{}^*\phi - h{}^*p,$$

where "$\gamma$" is defined as the projection magnification ratio of the epi-illumination projection lens, "$f_{fly}$" as the focal distance, in mm, of the fly-eye lens, "D" as the effective diameter, in mm, of the fly-eye lens, "$\phi$" as the effective diameter, in mm, of the filter comprised in the fluorescence cube, "h" as the distance, in mm, between the filter and the pupil position of the object lens, and "p" as the pitch, in mm, interval between two adjacent elemental lenses of the fly-eye lens.

BRIEF DESCRIPTION OF THE DRAWINGS

The present invention will be more apparent from the following detailed description when the accompanying drawings are referred to.

FIG. 1A is an upper plain view for describing the form of a fly-eye lens;

FIG. 1B is an outline diagram showing a cross section of the fly-eye lens shown in FIG. 1A;

FIG. 1C is an outline diagram showing a cross section of an exemplary modification of the fly-eye lens shown in FIG. 1A;

DESCRIPTION OF THE PREFERRED EMBODIMENTS

The following is a description of the preferred embodiment of the present invention with reference to the accompanying drawings.

FIG. 1A is an upper plain view showing an exemplary form of a fly-eye lens. As shown in FIG. 1A, the fly-eye lens 1 is an optical element produced by arranging miniature elemental lenses 2 in precise regularity (simply noted as "arrayed"). Because of its form, it is called a fly-eye lens or lens array.

FIG. 1B is an outline diagram showing a cross-section of the fly-eye lens 1. As shown in FIG. 1B, the curvature of the elemental lens 2 of the fly-eye lens 1 is designed so as to match the optical axes of the curvature between the front surface and rear surface. Meanwhile, FIG. 1C is an outline diagram showing a cross section of an exemplary modification of the fly-eye lens 1. The fly-eye lens 1 shown in FIG. 1C is structured by combining two convex flat fly-eye lenses. The fly-eye lens 1 configured as shown here is easy to produce when the focal distance of a fly-eye lens 1 has to be elongated.

Figure 2:
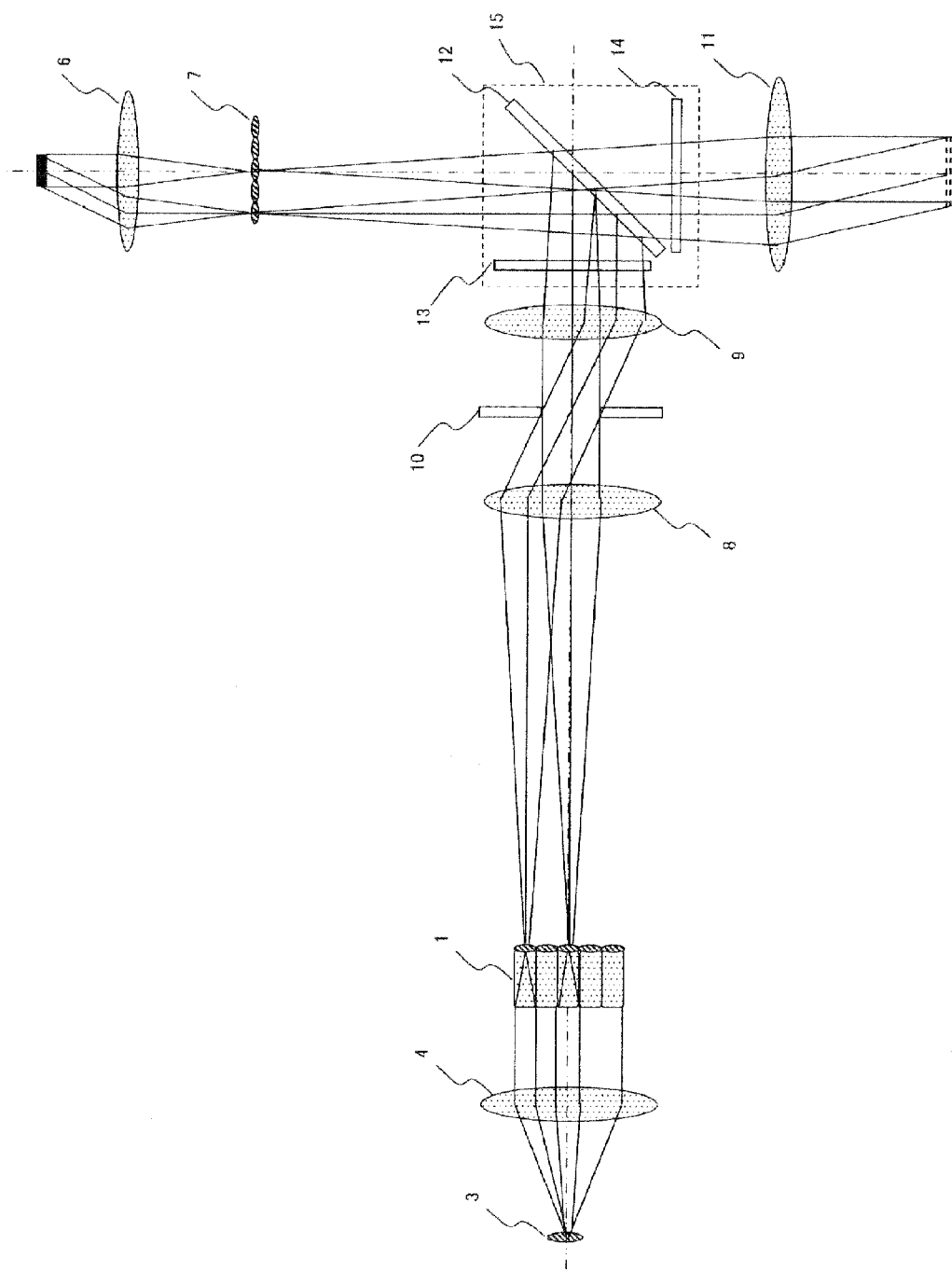
FIG. 2 is an outline diagram showing a comprisal when a fly-eye lens is incorporated in an epi-illumination optical system.

FIG. 2 is an outline diagram showing a comprisal when a fly-eye lens is incorporated in the epi-illumination optical system of a microscope. As shown in FIG. 2, the illumination optical system of a microscope comprises: a light source 3 for emitting an illumination light; a collector lens 4 for converting the illumination light into a parallel light flux; a fly-eye lens 1 arranged in the parallel light flux; and projection lens 8 and 9 for projecting the image of the light source 3 generated by the fly-eye lens 1 onto the pupil position 7 of an object lens 6. Further, a field stop 10 is placed between the projection lens 8 and 9.

The observation optical system of the microscope of the present configuration is primarily constituted by the object lens 6 and tube lens 11, and is a so-called infinity correction optical system. Further, the illumination optical system and observation optical system are separated by a dichroic mirror 12 placed between the object lens 6 and tube lens 11. An exciter filter 13 and a barrier filter 14, which are used for further securing the light beam separation, are equipped near to the dichroic mirror 12. Note that dichroic mirror 12, exciter filter 13 and barrier filter 14 are integrated as a fluorescence cube 15.

Figure 3:
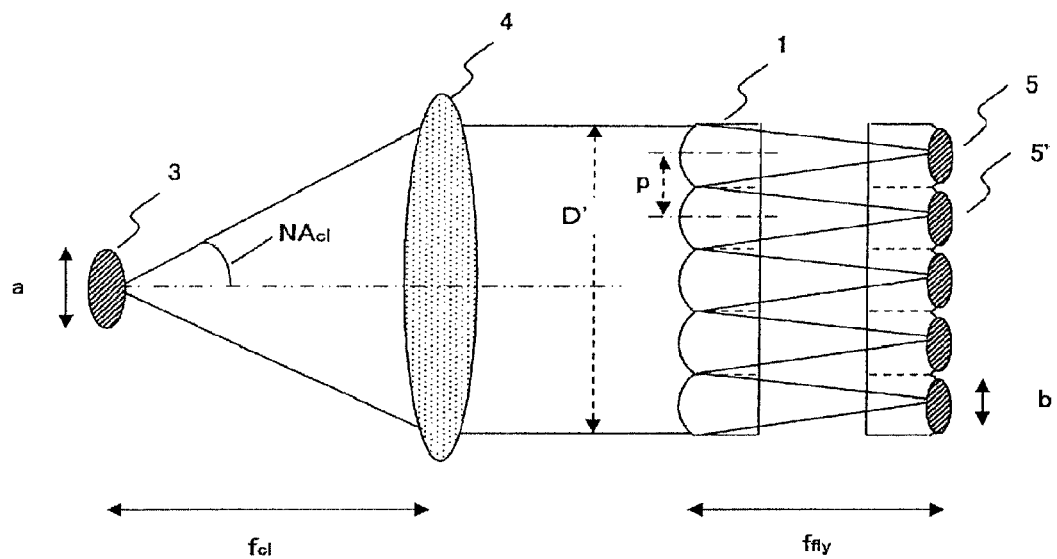
FIG. 3 is an outline diagram showing an optical system encompassing the area from a light source to the ejection surface of a fly-eye lens.

Next is a description of the flow of a light beam in the present configuration. The illumination light emitted from the light source 3 is converted into a parallel light flux by the collector lens 4 and is irradiated onto the fly-eye lens 1. In this case, the focal distance of the fly-eye lens 1 is designed to be approximately equal to the distance between the front and rear surfaces of the fly-eye lens 1. This configuration causes the image of the light source 3 to be formed for the elemental lens near to the ejection surface of the fly-eye lens 1. That is, a large number of miniature light sources (i.e., the images 5, 5', and soon of the light source 3) are formed on the respective ejection surfaces of the fly-eye lenses 1 as shown in FIG. 3. Then the large number of miniature light sources can be regarded as new light sources.

In this case, the brightness levels of the images 5, 5', and so on are determined in accordance with the ejecting angle of the illumination light ejected from the light source 3. That is, the images 5, 5', and so on of the light source 3 are now light sources obtained by dividing the distribution of light (noted as "light distribution" hereinafter) of the light source 3. Accordingly, setting the ejection surface of the fly-eye lens 1 on the surface of the pupil of the object lens 6 (or a conjugate position of the pupil surface) attains an illumination for which the light distribution characteristic of the light source 3 is cancelled out.

The projection lens 8 and 9 relay the surface light source formed on the ejection surface of the fly-eye lens 1 to the pupil surface of the object lens 6. The projection lens of the present configuration is constituted by a positive power lens 8 and by a positive power lens 9. Further, a surface which is conjugate with the surface of a specimen is formed between the positive power lens 8 and positive power lens 9. That is, placing the field stop 10 on a surface that is conjugate with the specimen surface makes it possible to adjust an illumination region on the specimen surface.

The observation optical system of the present configuration is an infinity correction type. That is, a parallel light flux is provided between the object lens 6 and tube lens 11 when a light beam tracking is performed from the specimen. This configuration reduces an influence on the imaging even when the dichroic mirror 12 is placed in the light flux between the object lens 6 and tube lens 11.

The illumination employing the fly-eye lens as described above makes it possible to correct the non-uniformity of a light source due to the light distribution characteristic. On the other hand, it is necessary to take a partial loss of the illumination light within the light path into consideration. Accordingly, the following is a description of an optimization of the illumination optical system employing a fly-eye lens, the illumination optical system aiming at suppressing a loss in the illumination light within the light path.

FIG. 3 is a diagram showing the optical system encompassing the area from the light source 3 to the ejection surface of the fly-eye lens 1. FIG. 3 further shows the parameters required for optimizing the optical system.

Referring to FIG. 3, "a" is defined as the maximum diameter, in mm, of the light source 3, "$f_{cl}$" as the focal distance, in mm, of the collector lens 4, and "$NA_{cl}$" as the numerical aperture thereof. "$f_{fly}$" is defined as the focal distance, in mm, on the fly-eye lens 1. Incidentally, in order to examine the performance of the illumination optical system employing a fly-eye lens, the light source 3 in this configuration is assumed to be a circle of which the diameter is "a" and to possess a constant brightness distribution. Such a light source is conceivably a surface light source, such as a light emitting diode (LED), or a quasi light source, such as an integrator rod edge. However, the present invention is not limited to those light sources.

In the aforementioned case, where "b" is defined as the maximum diameter, in mm, of the image of the light source 3 on the ejection surface of the fly-eye lens 1, "b" is given by:

$$b = a * f_{fly}/f_{cl}$$

Further, where "D'" is defined as the light flux diameter, in mm, emitted from the collector lens 4, D' is given by:

$$D' = 2 * f_{cl} * NA_{cl}$$

If the effective diameter of the collector lens 4 is configured to be sufficiently large in this case, the light flux diameter D' emitted from the collector lens 4 can be regarded as the effective diameter D (in mm) of the fly-eye lens 1 placed on the later stage.

Incidentally, if the size of the image 5 of the light source exceeds the diameter of the inscribed circle of the elemental lens 2 (that is, the pitch interval) of the fly-eye lens 1, the image of the light source 3 is unfavorably vignetted by the inner diameter of the elemental lens 2. Based on the above consideration, the following expression (1) is obtained as a condition for the optimization utilized by the present invention:

$$b = a * (f_{fly}/f_{cl}) \leq p \qquad (1)$$

where "p" is defined as the pitch interval, in mm, of the elemental lens 2, that is, as the diameter of the inscribed circle of the elemental lens 2. FIG. 3 is a diagram for describing the condition.

Further, the expression (1) can be transformed to the following expression (2):

$$D \geq 2 * a * f_{fly} * NA_{cl}/p \qquad (2)$$

Figure 4:
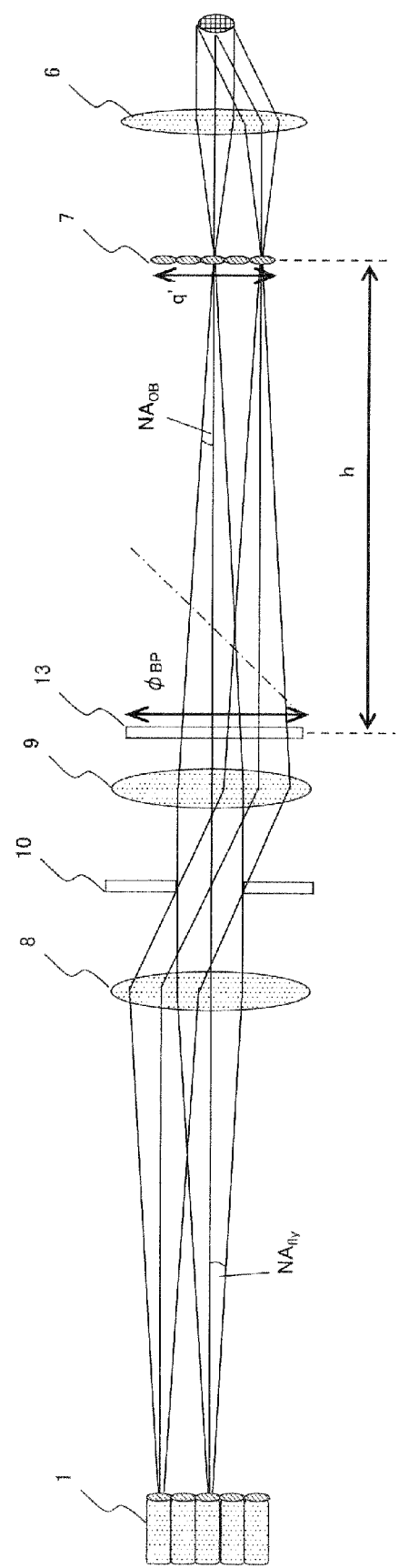
FIG. 4 is an outline diagram showing an optical system encompassing the area from a fly-eye lens to an object lens.

Next is a description of a loss in the illumination light occurring in the light path encompassing the area from the fly-eye lens 1 to the pupil position 7 of the object lens 6, with reference to FIG. 4. FIG. 4 is the diagram of a light beam showing the light beam encompassing the area from the fly-eye lens 1 to the specimen surface (which is shown in FIG. 2) without folding the light beam at the dichroic mirror 12 for convenience of description. FIG. 4 also shows the necessary optical parameters.

"$NA_{fly}$" is defined as the numerical aperture of the illumination light emitted from the edge of the fly-eye lens 1 and "$NA_{OB}$" as the numerical aperture applied when the illumination light is incident to the pupil position 7 of the object lens 6 by way of the projection lens 8 and 9. In this event, using the projection magnification of the projection lens 8 and 9, the following expression (3) applies:

$$NA_{fly} = \gamma * NA_{OB} \qquad (3)$$

Here, substituting $f_1$ and $f_2$ for the respective focal distances, in mm, of the projection lens 8 and 9, the following applies:

$$\gamma = f_2/f_1$$

Further, defining "D" as the effective diameter, in mm, of the fly-eye lens 1 and "q" as the diameter, in mm, of the projection image at the pupil position 7 of the object lens 6, the following expression (4) applies:

$$q' = \gamma * D \quad (4)$$

The diameter q' of the projection image is preferably smaller than the pupil diameter q (in mm) of the object lens 6. Therefore, it will preferably satisfy the following expression (5):

$$q \geq \gamma * D \quad (5)$$

In order to prevent the exciter filter 13 from causing a vignetting to the illumination light, the following expression (6) needs to be satisfied:

$$\phi_{BP} > q' + 2 * h * NA_{OB} \quad (6),$$

where "$\phi_{BP}$" is defined as the diameter, in mm, of the exciter filter 13 and "h" as the distance, in mm, between the exciter filter 13 and the pupil 7 of the object lens 6. Meanwhile, the numerical aperture $NA_{fly}$ of the illumination light emitted from the edge of the fly-eye lens 1 can also be represented by the following expression (7) by using the pitch p of the elemental lens 2, in addition to using the above described expression (3):

$$NA_{fly} = p/(2 * f_{fly}) \quad (7)$$

Therefore, on the basis of the above described expressions (3), (4), (6) and (7), the following expression (8) is obtained as the condition for a fly-eye lens 1 in order for the emitted illumination light to reach the pupil position 7 of the object lens 6 without being influenced by the vignetting of the exciter filter 13:

$$\phi_{BP} > D * \gamma + (h * p)/(f_{fly} * \gamma) \quad (8)$$

Configuring a fly-eye lens so as to satisfy the above expression (8) prevents the vignetting of a filter (i.e., the exciter filter 13 in this case) within the fluorescence cube 15, making it possible to attain a uniform illumination even in the periphery of a field.

Figure 5:
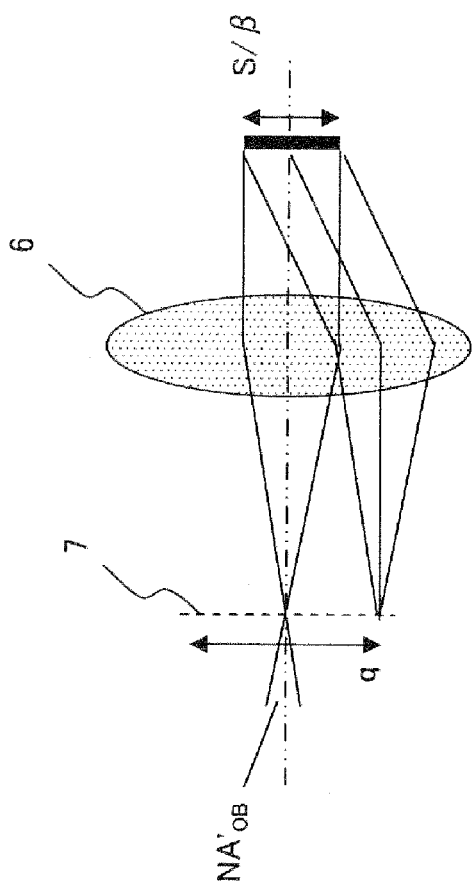
FIG. 5 is a diagram describing the relationship between the field number of an object lens and the numerical aperture (NA) at the pupil position.

Next, consider a limitation by the field number S (in mm) and magnification ratio β of an object lens. FIG. 5 is a diagram describing the limitation by the field number S and the magnification ratio β. An object lens commonly possesses a property, called a field number, expressing the scope of an apparent field of view. Further, the scope of an actual field of view is expressed by S/β by using the field number S and magnification ratio β. The field number actually represents the size of a field stop provided for an eye piece lens. On the other hand, as an indicator showing the performance of an object lens, the field number is equivalent to the maximum numerical aperture NA at the pupil position 7 on the side to which the illumination light is incident. Considering that the diameter of the exciter filter 13 is determined dependent on the numerical aperture $NA_{OB}$ that is applied when entering the pupil position 7 of the object lens 6 as shown by the expression (6), the field number S and magnification ratio 13 actually influence the condition for suppressing a partial loss in the illumination light.

That is, there is a limitation of the illumination light caused by the performance of the object lens. Even if a uniform illumination is attained in the Koehler illumination, it is not effective if the illumination is irradiated on the necessary region. In contrast, if an unnecessarily wide region is covered, such a practice is actually an over-specification.

Note that the field number represents an apparent scope of a field of view, and therefore the field number is determined approximately on the basis of the angle of view of the human being. The field number is accordingly designed to be in the range of 18.0 mm to 26.5 mm.

As exemplified in FIG. 5, for an object lens with the field number S, magnification ratio β, and focal distance $f_{OB}$ (in mm), the maximum numerical aperture $NA'_{OB}$ at the pupil position 7 is represented by the following expression (9):

$$NA'_{OB} = S/(2 * f_{OB} * \beta) \quad (9)$$

That is, with the field number being between 18.0 mm and 26.5 mm, the maximum numerical aperture $NA'_{OB}$ falls in the range shown by the following expression (10):

$$18.0 \text{ mm}/(2 * f_{OB} * \beta) \leq NA'_{OB} \leq 26.5 \text{ mm}/(2 * f_{OB} * \beta) \quad (10)$$

Further, the $NA'_{OB}$ limits the $NA_{OB}$ given by the expression (3).

Using the expressions (3) and (7), the expression (10) can be transformed as follows:

$$18.0 \text{ mm}/(f_{OB} * \beta) \geq p/(\gamma * f_{fly}) \leq 26.5 \text{ mm}/(f_{OB} * \beta) \quad (ii)$$

Further, using the focal distance $f_{OB}$ of the object lens and the focal distance $f_{TL}$ of the tube lens, the magnification ratio β of the object lens can be expressed by:

$$\beta = f_{TL}/f_{OB}$$

Therefore, the expression (11) can be transformed into the following expression (12):

$$18.0 \text{ mm}/f_{TL} \leq p/(\gamma * f_{fly}) \leq 26.5 \text{ mm}/f_{TL} \quad (12)$$

As described above, the satisfying of the above described expressions makes it possible to provide an illumination device comprising a fly-eye lens capable of projecting the illumination light emitted from a light source onto the surface of a specimen without allowing waste. The following discloses the respective numerical value data applicable to the embodiments satisfying the above described expressions.

Embodiment 1

The numerical value data shown in the following Table 1 premises a microscope illumination device carrying out an epi-illumination using a mercury arc light source in an upright microscope. Note that the magnification ratio of the object lens is assumed to be 10×.

TABLE 1

| | | |
|---|---|---|
| Focal distance of collector lens | $f_{CL}$ | 30.0 |
| Projection magnification ratio of projection lens | γ | 0.70 |
| NA of ejection side of fly-eye lens | $NA_{fly}$ | 0.050 |
| Effective diameter of fly-eye lens | D | 18.0 |
| Pitch of fly-eye lens | p | 3.00 |
| Focal distance of fly-eye lens | $f_{fly}$ | 30.0 |
| Magnification ratio of object lens | β | 10 |
| Pupil diameter of object lens | q | 14.4 |
| Field number of object lens | S | 26.5 |
| Focal distance of object lens | $f_{OB}$ | 18.00 |
| Effective diameter of exciter filter | $\phi_{BP}$ | 22.0 |
| Distance from object lens pupil to exciter filter | h | 60.0 |
| Maximum diameter of light source | a | 0.50 |

The present embodiment using these numerical values satisfies the above described expressions (1), (5), (8) and (11).

Embodiment 2

The numerical value data shown in the following Table 2 premises a microscope illumination device carrying out an epi-illumination using a mercury arc light source in an upright microscope. Note that the magnification ratio of the object lens is assumed to be 40×.

TABLE 2

| Focal distance of collector lens | $f_{CL}$ | 6.0 |
|---|---|---|
| Projection magnification ratio of projection lens | $\gamma$ | 0.70 |
| NA of ejection side of fly-eye lens | $NA_{fly}$ | 0.050 |
| Effective diameter of fly-eye lens | D | 8.0 |
| Pitch of fly-eye lens | p | 1.50 |
| Focal distance of fly-eye lens | $f_{fly}$ | 15.0 |
| Magnification ratio of object lens | $\beta$ | 40 |
| Pupil diameter of object lens | q | 8.6 |
| Field number of object lens | S | 26.5 |
| Focal distance of object lens | $f_{OB}$ | 4.50 |
| Effective diameter of exciter filter | $\phi_{BP}$ | 22.0 |
| Distance from object lens pupil to exciter filter | h | 110.0 |
| Maximum diameter of light source | a | 0.50 |

The present embodiment using these numerical values satisfies the above described expressions (1), (5), (8) and (11).

Embodiment 3

The numerical value data shown in the following Table 3 premises a microscope illumination device carrying out an epi-illumination using a mercury arc light source in an inverted microscope. Note that the magnification ratio of the object lens is assumed to be 100×.

TABLE 3

| Focal distance of collector lens | $f_{CL}$ | 10.0 |
|---|---|---|
| Projection magnification ratio of projection lens | $\gamma$ | 1.10 |
| NA of ejection side of fly-eye lens | $NA_{fly}$ | 0.080 |
| Effective diameter of fly-eye lens | D | 4.5 |
| Pitch of fly-eye lens | p | 1.60 |
| Focal distance of fly-eye lens | $f_{fly}$ | 10.0 |
| Magnification ratio of object lens | $\beta$ | 100 |
| Pupil diameter of object lens | q | 5.0 |
| Field number of object lens | S | 26.5 |
| Focal distance of object lens | $f_{OB}$ | 1.80 |
| Effective diameter of exciter filter | $\phi_{BP}$ | 22.0 |
| Distance from object lens pupil to exciter filter | h | 110.0 |
| Maximum diameter of light source | a | 0.50 |

The present embodiment using these numerical values satisfies the above described expressions (1), (5), (8) and (11).

Embodiment 4

The numerical value data shown in the following Table 4 premises a microscope illumination device carrying out an epi-illumination using a quasi light source by means of a liquid fiber in an inverted microscope. Note that the magnification ratio of the object lens is assumed to be 100×.

TABLE 4

| Focal distance of collector lens | $f_{CL}$ | 20.0 |
|---|---|---|
| Projection magnification ratio of projection lens | $\gamma$ | 1.10 |
| NA of ejection side of fly-eye lens | $NA_{fly}$ | 0.080 |
| Effective diameter of fly-eye lens | D | 4.5 |
| Pitch of fly-eye lens | p | 1.00 |
| Focal distance of fly-eye lens | $f_{fly}$ | 6.3 |
| Magnification ratio of object lens | $\beta$ | 100 |
| Pupil diameter of object lens | q | 5.0 |
| Field number of object lens | S | 26.5 |
| Focal distance of object lens | $f_{OB}$ | 1.80 |
| Effective diameter of exciter filter | $\phi_{BP}$ | 22.0 |
| Distance from object lens pupil to exciter filter | h | 110.0 |
| Maximum diameter of light source | a | 3.00 |

The present embodiment using these numerical values satisfies the above described expressions (1), (5), (8) and (11).

Embodiment 5

The numerical value data shown in the following Table 5 premises a microscope illumination device carrying out an epi-illumination using an LED light source in an inverted microscope. Note that the magnification ratio of the object lens is assumed to be 10×.

TABLE 5

| Focal distance of collector lens | $f_{CL}$ | 20.0 |
|---|---|---|
| Projection magnification ratio of projection lens | $\gamma$ | 0.43 |
| NA of ejection side of fly-eye lens | $NA_{fly}$ | 0.030 |
| Effective diameter of fly-eye lens | D | 15.0 |
| Pitch of fly-eye lens | p | 3.00 |
| Focal distance of fly-eye lens | $f_{fly}$ | 50.0 |
| Magnification ratio of object lens | $\beta$ | 10 |
| Pupil diameter of object lens | q | 14.4 |
| Field number of object lens | S | 26.5 |
| Focal distance of object lens | $f_{OB}$ | 18.00 |
| Effective diameter of exciter filter | $\phi_{BP}$ | 22.0 |
| Distance from object lens pupil to exciter filter | h | 110.0 |
| Maximum diameter of light source | a | 1.00 |

The present embodiment using these numerical values satisfies the above described expressions (1), (5), (8) and (11).

Embodiment 6

The numerical value data shown in the following Table 6 premises a microscope illumination device carrying out an epi-illumination using an LED light source in an inverted microscope. Note that the magnification ratio of the object lens is assumed to be 100×.

TABLE 6

| Focal distance of collector lens | $f_{CL}$ | 10.0 |
|---|---|---|
| Projection magnification ratio of projection lens | $\gamma$ | 1.40 |
| NA of ejection side of fly-eye lens | $NA_{fly}$ | 0.080 |
| Effective diameter of fly-eye lens | D | 3.5 |
| Pitch of fly-eye lens | p | 1.60 |
| Focal distance of fly-eye lens | $f_{fly}$ | 10.0 |
| Magnification ratio of object lens | $\beta$ | 100 |
| Pupil diameter of object lens | q | 5.0 |
| Field number of object lens | S | 18.0 |
| Focal distance of object lens | $f_{OB}$ | 1.80 |
| Effective diameter of exciter filter | $\phi_{BP}$ | 22.0 |
| Distance from object lens pupil to exciter filter | h | 110.0 |
| Maximum diameter of light source | a | 0.50 |

The present embodiment using these numerical values satisfies the above described expressions (1), (5), (8) and (11).

Embodiment 7

The numerical value data shown in the following Table 7 premises a microscope illumination device carrying out an epi-illumination using an LED light source in an inverted microscope. Note that the magnification ratio of the object lens is assumed to be 10×.

TABLE 7

| Focal distance of collector lens | $f_{CL}$ | 20.0 |
|---|---|---|
| Projection magnification ratio of projection lens | $\gamma$ | 0.55 |
| NA of ejection side of fly-eye lens | $NA_{fly}$ | 0.030 |

TABLE 7-continued

| | | |
|---|---|---|
| Effective diameter of fly-eye lens | D | 15.0 |
| Pitch of fly-eye lens | p | 3.00 |
| Focal distance of fly-eye lens | $f_{fly}$ | 50.0 |
| Magnification ratio of object lens | β | 10 |
| Pupil diameter of object lens | q | 14.4 |
| Field number of object lens | S | 18.0 |
| Focal distance of object lens | $f_{OB}$ | 18.00 |
| Effective diameter of exciter filter | $\phi_{BP}$ | 22.0 |
| Distance from object lens pupil to exciter filter | h | 110.0 |
| Maximum diameter of light source | a | 1.00 |

The present embodiment using these numerical values satisfies the above described expressions (1), (5), (8) and (11).

What is claimed is:

1. A microscope illumination device, comprising:
a light source;
an object lens for illuminating a specimen surface;
a collector lens for converting diverging light emitted by the light source into parallel light;
a fly-eye lens placed near to the position of the rear focal point of the collector lens;
an epi-illumination projection lens for projecting a plurality of light source images generated by the fly-eye lens onto a pupil of the object lens;
a tube lens for imaging an observation light emitted from the object lens; and
a fluorescence cube placed between the object lens and epi-illumination projection lens and which comprises at least one filter, wherein
the following conditional expression is satisfied:

$$\gamma^2 * f_{fly} * D < \gamma * f_{fly} * \phi - h * p,$$

where "γ" is defined as the projection magnification ratio of the epi-illumination projection lens, "$f_{fly}$" as the focal distance, in mm, of the fly-eye lens, "D" as the effective diameter, in mm, of the fly-eye lens, "φ" as the effective diameter, in mm, of the filter comprised in the fluorescence cube, "h" as the distance, in mm, between the filter and the pupil position of the object lens, and "p" as the pitch interval, in mm, between two adjacent elemental lenses of the fly-eye lens.

2. The microscope illumination device according to claim 1, wherein
the following conditional expression is satisfied:

$$18.0 \text{ mm}*\gamma*f_{fly} \leq p*\beta*f_{OB} \leq 26.5 \text{ mm}*\gamma*f_{fly},$$

where "β" is defined as the magnification ratio of the object lens and as the focal distance, in mm, of the object lens.

3. The microscope illumination device according to claim 1, wherein
the following conditional expression is satisfied:

$$18.0 \text{ mm}*\gamma*f_{fly} \leq p*f_{TL} \leq 26.5 \text{ mm}*\gamma*f_{fly},$$

where is defined as the focal distance, in mm, of the tube lens.

4. The microscope illumination device according to claim 1, wherein
the following conditional expression is satisfied:

$$a*(f_{fly}/f_{cl}) \leq p,$$

where "a" is defined as the maximum diameter, in mm, of the light source and "$f_{cl}$" as the focal distance, in mm, of the collector lens.

5. The microscope illumination device according to claim 1, wherein
the following conditional expression is satisfied:

$$D \geq 2*a*f_{fly}*NA_{cl}/p,$$

where "a" is defined as the maximum diameter of the light source, in mm, and "$NA_{cl}$" as the numerical aperture of the collector lens.

6. The microscope illumination device according to claim 1, wherein
the following conditional expression is satisfied:

$$D \leq q/\gamma,$$

where "q" is defined as the pupil diameter, in mm, of the object lens.

* * * * *